No. 715,641. Patented Dec. 9, 1902.
H. T. CRONK.
HOSE COUPLING.
(Application filed Dec. 18, 1901.)
(No Model.)
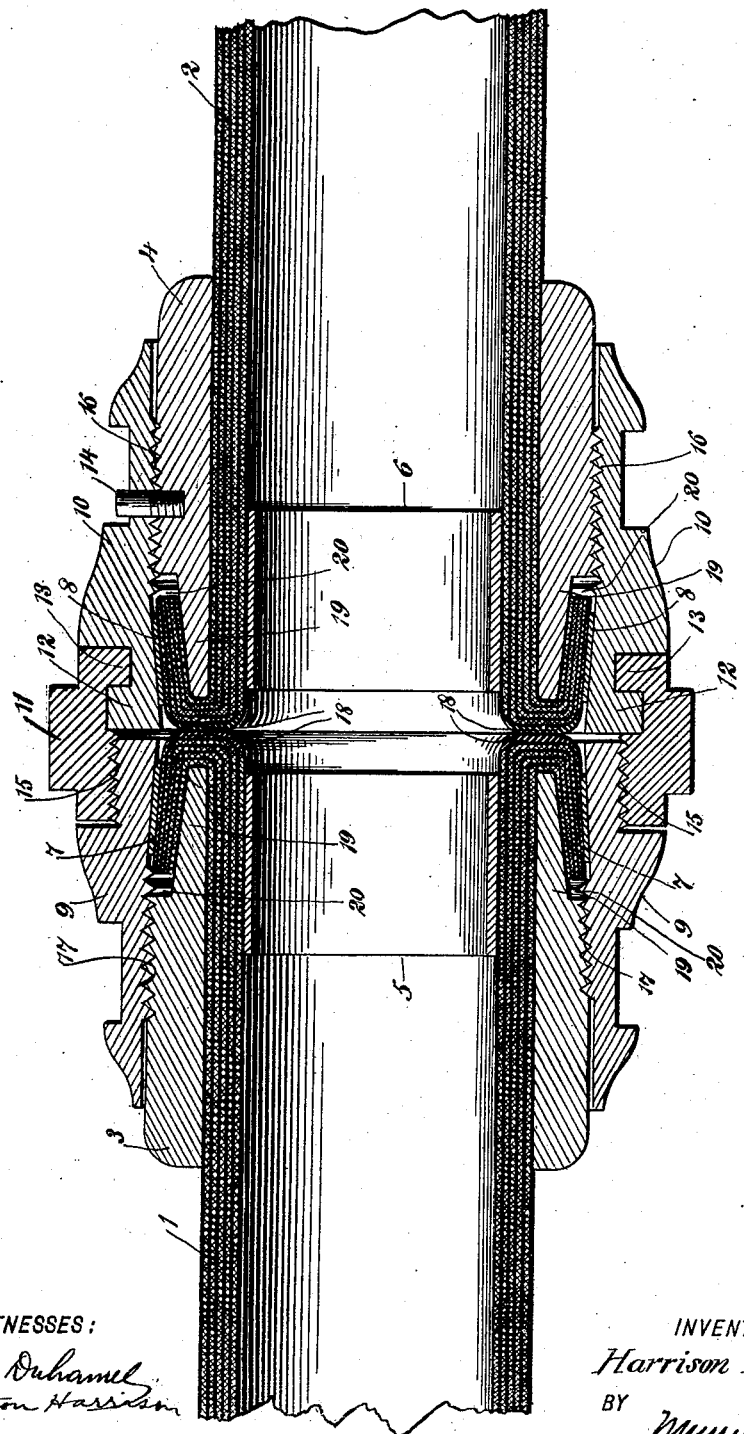
WITNESSES:
INVENTOR
Harrison T. Cronk
BY
ATTORNEYS

UNITED STATES PATENT OFFICE.

HARRISON TAYLOR CRONK, OF NEW YORK, N. Y.

HOSE-COUPLING.

SPECIFICATION forming part of Letters Patent No. 715,641, dated December 9, 1902.

Original application filed March 5, 1901, Serial No. 49,773. Divided and this application filed December 18, 1901. Serial No. 86,414. (No model.)

*To all whom it may concern:*

Be it known that I, HARRISON TAYLOR CRONK, a citizen of the United States, and a resident of the city of New York, borough of Manhattan, in the county and State of New York, have invented a new and Improved Hose-Coupling, of which the following is a full, clear, and exact description.

My invention relates to hose-couplings, and is a division of a former application filed by me—to wit, application Serial No. 49,773, filed March 5, 1901.

The invention consists in the novel construction and combination of the several parts, as will be hereinafter fully set forth, and pointed out in the claims.

Reference is to be had to the accompanying drawing, forming a part of this specification, in which the figure is a longitudinal sectional view of the adjacent ends of two sections of an ordinary fire-hose fitted with my invention.

The respective ends of two adjacent sections 1 2 of hose are fitted externally with coupling-sections 3 4 and are fitted internally with annular members 5 6. The purpose of these annular members is to prevent the hose from wrinkling or collapsing when the ends thereof are bent backward, as hereinafter described. Thin annular bands 7 8, having a slightly conical taper, are provided for the purpose of forming a smooth surface, thus facilitating the rotation of the clamping-section and also for holding the extreme ends of the hose when folded backward. Clamping-sections 9 and 10 are fitted upon the coupling-sections. Upon the clamping-section 10 is mounted a nut 11, provided with an annular flange 13 for engaging a somewhat similar but oppositely-disposed annular flange 12, integral with said clamping-section 10. The clamping-nut 11 is revoluble relatively to the clamping-section 10 and is provided with screw-threads 15 for engaging the clamping-section 9. The coupling-sections and clamping-sections are detachably secured together, so as to prevent relative rotation thereof, by means of screws 14, one or more of which may be provided. The outer surfaces of the coupling-sections and the inner surfaces of the clamping-sections are provided with screw-threads 16 17, whereby said parts are detachably secured together.

The internal surface of the hose is provided with the usual rubber sheet 18, practically integral therewith, so that when the ends of the hose are bent outwardly, as shown in the drawing, the abutting surfaces 18 will be resilient and thoroughly adapted to form a water-tight joint when the coupling-sections 3 and 4 are actuated toward each other by means of the clamping mechanism. The coupling-sections are each provided with a neck 19, forming a chamber 20 for the purpose of accommodating the flared or bent portion of the hose upon which the annular members 7 and 8 are fitted. A soft washer may be inserted between the abutting rubber sheets 18, if desired.

My invention is used as follows: The two adjacent free ends 1 2 of the hose are fitted internally with the cylindrical members 5 6 and are then fitted externally with the coupling-sections 3 and 4. The ends of the hose project an inch or two beyond the ends of the coupling-sections. These projecting ends of the hose are then bent outwardly and backwardly by any suitable means, so as to embrace the necks 19, and the conical rings 7 and 8 are placed in position so as to hold the ends of the hose thus folded. The clamping-sections are next screwed upon the coupling-sections by means of the threads 16 17, thus binding the flanges permanently in place. The clamping-nut 11 is now turned with an ordinary wrench, and the threads 15 thereof immediately cause the now-assembled end composed of the parts 1, 3, 5, 7, and 9 to be drawn firmly against the end composed of the parts 2, 4, 6, 8, and 10. In this movement the clamping-sections do not move relatively to the coupling-sections, the clamping-nut 11 turning freely, with its flanged head 13 against the flanged head 12 of the clamping-section 10, the entire clamping-section 9 moving bodily inward toward the clamping-section 10. The result is that the abutting surfaces 18 of the hose are squeezed together tightly, so as to form a water-tight joint. The resiliency of the hose makes this effect tolerably certain, even if the hose is not quite of uniform thickness. It will be observed, therefore, that the extreme ends of the hose after being bent outwardly, as described, are completely sunken in the recesses 20 and that the tightness of the joint is regulated at will by the movements of the clamping-nut 11.

Having thus described my invention, I claim as new and desire to secure by Letters Patent—

1. A hose having its ends turned over or back, forming a flange, an inner coupling-section having its end beveled on its outer surface and projected into the space between the body of the hose and the flange, a conical ring surrounding said flange, and a clamping-section having its end beveled on its inner surface and arranged to engage the said ring to clamp the hose-flange against the inner coupling-section.

2. A hose having its end turned back or over outwardly, forming a flange, a coupling-section provided with an end portion projecting into the space between the body of the hose and its flange, and an annular band on the bent portion of the hose, where its body connects with said flange.

3. A hose-coupling comprising a pair of coupling-sections surrounding the body of a hose and provided with necks upon which the ends of the hose are folded backward, annular members for securing said ends of said hose to said necks, and mechanism controllable at will, for actuating said coupling-sections toward each other.

4. A hose-coupling, comprising coupling-sections surrounding the body of the hose and provided with necks upon which the ends of the hose are folded backward, conical fastenings for holding said ends of said hose thus folded, and clamping mechanism for actuating said coupling-sections toward and from each other.

5. A hose-coupling, comprising coupling-sections surrounding the body of the hose and provided with conical necks upon which the ends of the hose are folded backward, conical rings parallel with said necks for securing the ends of said hose thereto, clamping-sections provided with conical portions for engaging said conical rings, and means, controllable at will, for actuating said coupling-sections toward and from each other.

6. A hose-coupling, comprising coupling-sections surrounding the body of the hose and provided with necks upon which the ends of the hose are folded backward, annular members surrounding said necks for securing the folded ends of the hose thereto, means for actuating the said coupling-sections toward and from each other, and annular members located in said hose for preventing the same from collapsing while said ends are being folded.

7. A hose-coupling, comprising coupling-sections surrounding the body of the hose and provided with necks upon which the ends of the hose are folded backward, annular members located in said hose to prevent the same from collapsing while said ends are being folded, and means, controllable at will, for actuating said coupling-sections toward and from each other.

8. A hose-coupling, comprising coupling-sections surrounding the body of the hose and provided with necks upon which the ends of the hose are folded backward, annular members located in said hose to prevent the same from collapsing, clamping-sections mounted upon said coupling-sections, an annular member threaded upon one of said clamping members and provided with an annular flange loosely engaging the other clamping member for the purpose of actuating said coupling-sections toward and from each other.

In testimony whereof I have signed my name to this specification in the presence of two subscribing witnesses.

HARRISON TAYLOR CRONK.

Witnesses:
HENRY EMERSON,
RANDALL H. LUDLOW.